April 9, 1963     N. D. KAY     3,085,244
ISO-CONTOUR CIRCUITS
Filed Sept. 5, 1956     4 Sheets-Sheet 1
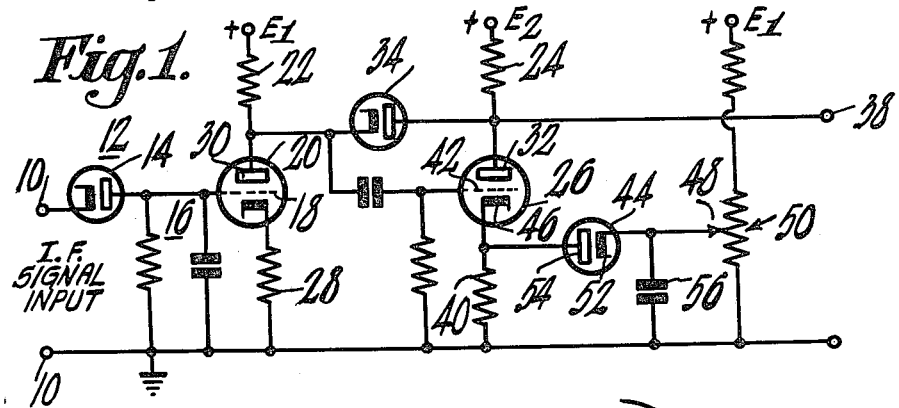
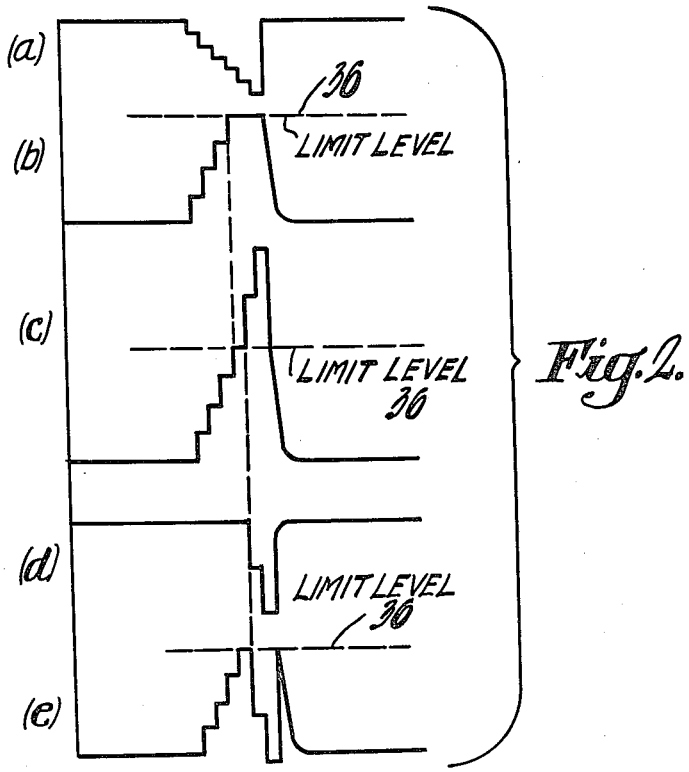
INVENTOR.
Norman David Kay
BY
ATTORNEY

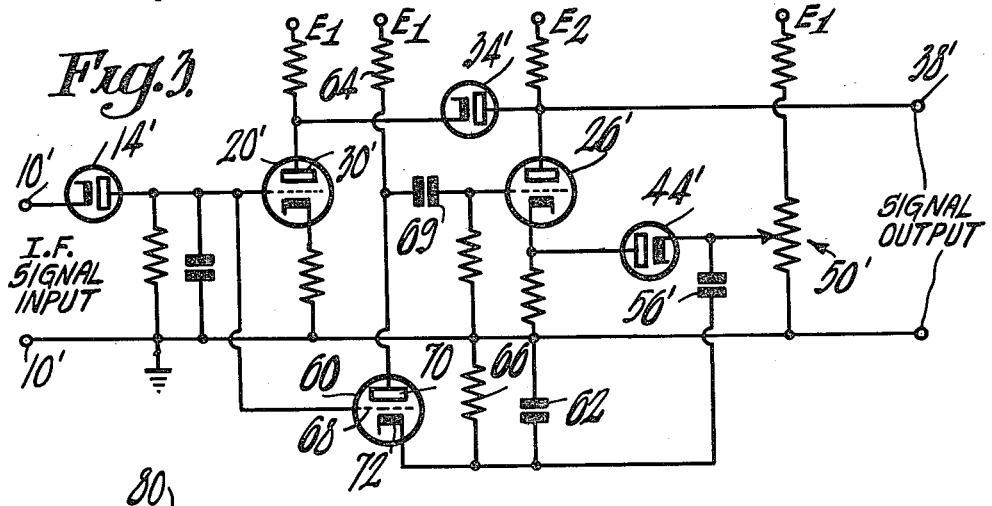
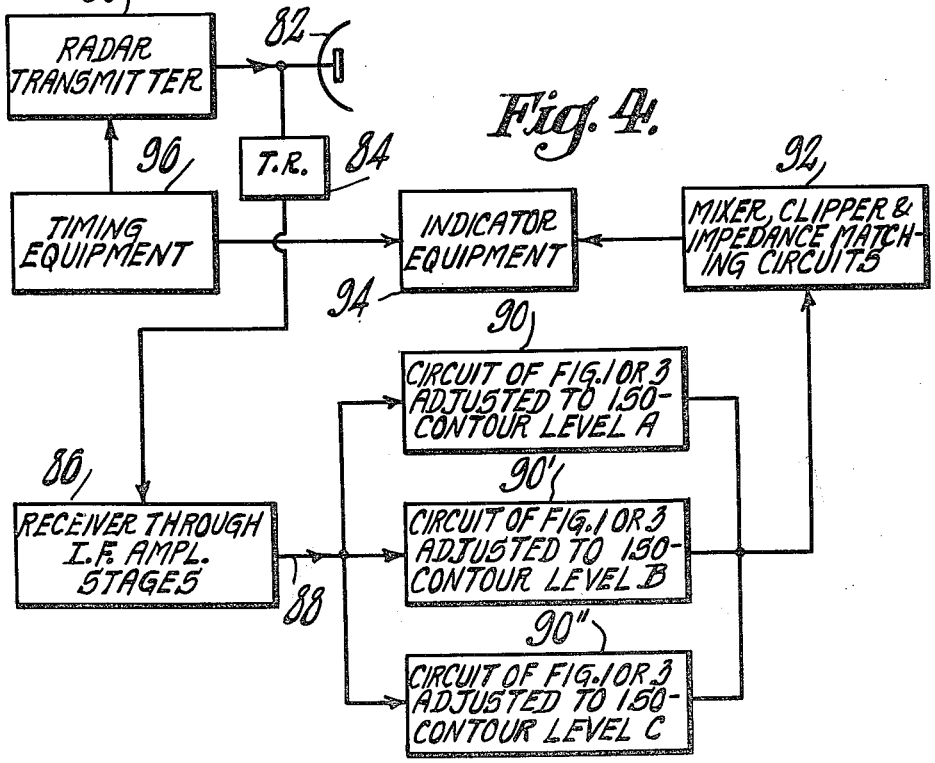

April 9, 1963  N. D. KAY  3,085,244
ISO-CONTOUR CIRCUITS
Filed Sept. 5, 1956  4 Sheets-Sheet 3
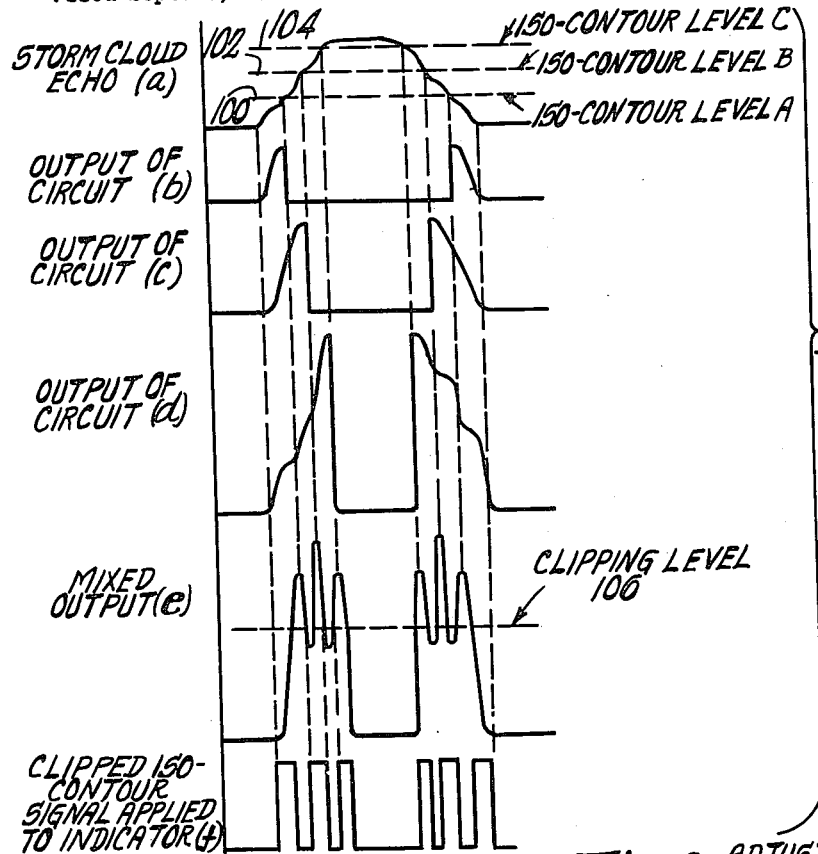
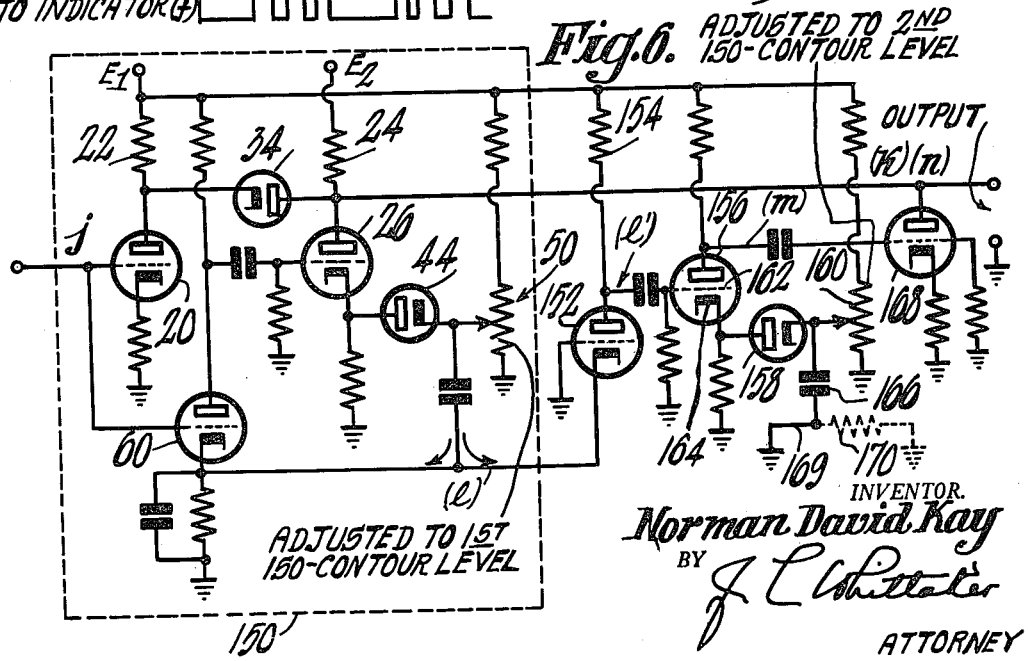
INVENTOR.
*Norman David Kay*
BY
*J. C. Whittaker*
ATTORNEY

3,085,244
ISO-CONTOUR CIRCUITS
Norman David Kay, Los Angeles, Calif., assignor to Radio Corporation of America, a corporation of Delaware
Filed Sept. 5, 1956, Ser. No. 608,112
15 Claims. (Cl. 343—11)

This invention relates to improved iso-contour circuits for weather radar systems and to improved circuit components which are especially useful in iso-contour circuits.

The radar return signal from a storm area is ordinarily sufficiently strong to saturate a relatively large area on the radar indicator screen. This is true even if, as is the usual case, the storm has regions of widely different precipitation intensities. Modern weather radar systems employ "iso-contour" circuits to overcome this difficulty. These process the storm return signals in such manner that the storm appears on the radar indicator screen as either a bright irregular loop surrounding a black hole or concentric alternate bright and dark irregular loops, somewhat like isohyetal lines of a weather map. The former type of presentation is especially useful in airborne radar systems as it is simple and easily and quickly interpreted. It enables the pilot to direct his aircraft through the lower intensity precipitation regions and therby to avoid, to a large extent, the effects of the storm. The latter type of presentation is somewhat more difficult to interpret and requires bulkier, more complex circuitry. It is more suitable for larger, ground weather radar systems.

Known circuits for producing iso-contour displays are fairly complex. Two separate channels are required for each iso-contour indication which is produced. One channel may include, for example, a relatively low gain intermediate frequency amplifier, a video amplifier and a limiter. The second may include an intermediate frequency amplifier of somewhat higher gain, a video amplifier, a limiter and an inverter. The signal outputs of the two channels are combined in a mixer circuit and then applied to the indicator.

An object of this invention is to provide improved and greatly simplified iso-contour circuits.

Another object is to provide improved amplifier circuits which can automatically be switched from one gain setting to another.

In the system of the present invention only one channel is required for an iso-contour indication and that channel has relatively few stages. The video signal derived from a storm radar return signal is applied to the input circuit of a polarity inverting amplification stage. The video signal, limited in amplitude, is also applied in the same polarity to the output circuit of the same stage. The amplification stage has substantially zero gain for signals of lower than a predetermined iso-contour level. The gain of the stage is automatically substantially increased for signals of greater than this level. The resultant output signal, when the storm return signal exceeds a given amplitude, is double peaked and, when applied to a plan position type indicator, appears as a bright loop surrounding a black hole. The black hole is indicative of a region of high rainfall intensity.

A preferred form of amplification stage includes an electron discharge device having an anode load impedance and a cathode load impedance of substantially greater value than the anode load impedance. A diode is effectively connected in shunt with the cathode load impedance and is so biased that it begins to conduct when the signal applied to the discharge device exceeds the iso-contour level. The bias adjustment, in effect, is the iso-contour level setting. When the cathode load impedance is by-passed, the gain of the stage increases substantially, and the signal applied to the control grid of the stage, in effect, cancels the same signal applied to the anode of the stage.

Regeneration may be employed in order more quickly to increase the amplifier gain. For example, the signal by-passed by the rectifier mentioned above may be applied through a suitable coupling stage to the control grid of the amplifier in a polarity to enhance its effective gain. Abrupt switching from low to high gain is advantageous as it produces sharper signal transitions in the iso-contour display.

The invention will be described in greater detail by reference to the following description taken in connection with the accompanying drawing in which:

FIGURE 1 is a schematic circuit diagram of one form of the present invention;

FIGURE 2 is a sketch of the waveforms present at various points in the circuit of FIGURE 1;

FIGURE 3 is a schematic circuit diagram of another form of the present invention;

FIGURE 4 is a block circuit diagram of a radar system which includes the circuits of FIGURE 1 or 3;

FIGURE 5 is a drawing of waveforms to show how the system of FIGURE 4 operates;

FIGURE 6 is a block circuit diagram of a portion of another type of radar system which includes the circuits of FIGURE 3;

Figure 7:
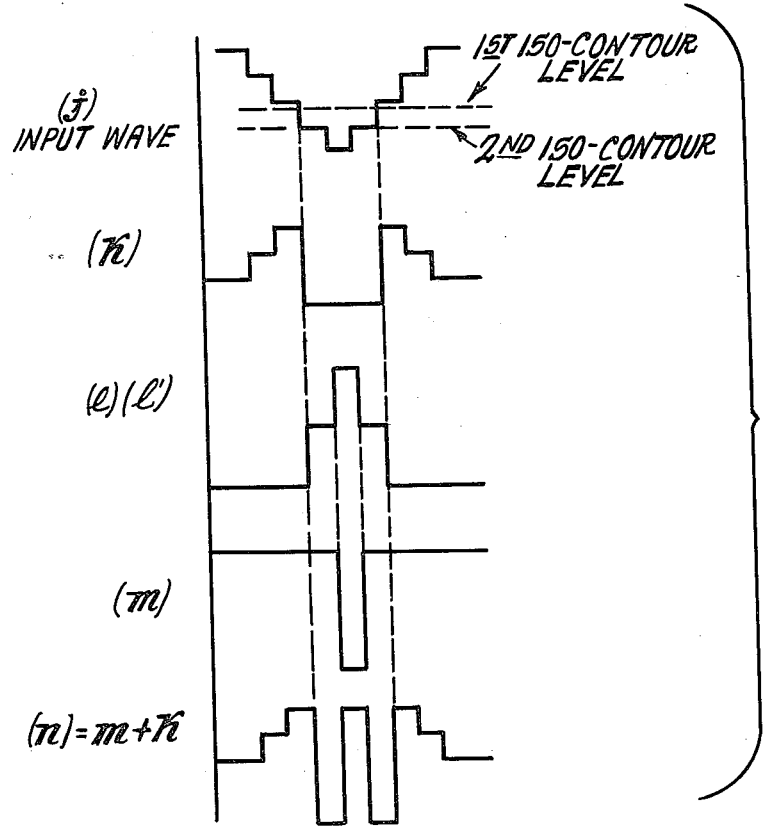
FIGURE 7 is a drawing of waveforms to show how the system of FIGURE 6 operates.

Referring to FIGURE 1, the intermediate frequency signal from the radar receiver is applied to terminals 10. The signal is detected by detector 12 which includes diode 14 and resistor-condenser network 16. The resultant video signal is applied to the control electrode 18 of electron discharge device 20, shown here as a triode. Solid state devices such as transistors or other types of vacuum tubes such as pentodes or the like may be employed instead, both here and in other parts of the circuit. The anode load resistor 22 of triode 20 is of greater value than the anode load resistor 24 of triode 26. In a practical circuit, resistor 22 may be 2½ or more times larger than resistor 24. Cathode resistor 28 serves as a cathode bias element and also provides degeneration so that only moderate gain is realized in tube 20. Note in this connection that it is desired to have greater gain in the iso-amplifiers (tubes 60 and 26) than in the limiter amplifier tube 20. The voltage $E_1$ is substantially greater than the voltage $E_2$.

In operation, neglecting for a moment the function of amplifier 26, when the input signal is relatively small, the voltage at anode 30 is more negative than that at anode 32, and diode 34, which is connected between the two anodes, conducts. If it is assumed, for example, that the input wave is of the shape shown in FIGURE 2a, diode 34 will conduct for the first three steps of the input wave and for part of the fourth step of the input wave. Note here that the wave of FIGURE 2a is shown merely for the purpose of explanation and is not meant to be similar to a storm echo.

When the output signal voltage of triode 20 reaches the voltage $E_2$, there is no voltage across the series combination of diode 34 and resistor 24, and consequently current flow through them ceases. This corresponds to the limit level shown by dashed line 36 in FIGURE 2b. (The actual limit level is determined by the relative values of resistors 22 and 24 and voltages $E_1$ and $E_2$.) As the output voltage of triode 20 rises above voltage $E_2$, diode 34 remains non-conducting since the diode plate cannot rise above $E_2$. The limited signal at anode 32 and output terminal 38 is as indicated in FIGURE 2b.

Returning to triode 26, cathode resistor 40 is substantially larger than anode load resistor 24. In a practical circuit, resistor 40 may be 150 times or more the value of resistor 24. In this mode of operation, the control grid 42 to anode 32 triode gain is substantially zero, and the portion of the signal applied to control grid 42 which is below limit level 36 (FIGURE 2b) has substantially no effect on the signal which passes from anode 30 through diode 34 to output terminal 38. However, when the output signal of amplifier 20 reaches the limit level and diode 34 is cut off, the effective anode load impedance of amplifier 20 is increased. This means that the gain of the triode 20 is now also increased, and the portion of the input signal of an amplitude greater than the limit level is amplified more strongly than that of the portion below the limit level. The amplified signal at anode 30, which is applied to control grid 42, is therefore somewhat as shown in FIGURE 2c.

Diode 44 is connected between the cathode 46 of triode 26 and the adjustable tap 48 of potentiometer 50. The tap is adjusted to a value such that diode cathode 52 is more positive than diode anode 54 for signals applied to triode control grid 42 which are below the limit level. Therefore, the diode does not normally conduct. However, when the signal applied to control grid 42 is greater than the limit level, the potential of cathode 46 rises, due to increased current flow through cathode resistor 40, and becomes positive relative to tap 48. Diode 44 now conducts. Capacitor 56, connected between diode cathode 52 and ground, is of a relatively large value and provides a low impedance path for the video signal. The effect then of applying to control grid 42 a signal having an amplitude greater than the limit level is to place low impedance 56 in shunt with resistor 40 and thereby to convert stage 26 to a high-gain amplifier.

The output signal of triode 26, due to the signal applied to its control grid, is shown in FIGURE 2d. It is automatically mixed with the limited signal output of stage 20, shown in FIGURE 2b, to obtain the resultant wave shown in FIGURE 2e. This last-named wave may be directly applied to the radar indicator or may be clipped and shaped and then applied to the radar indicator.

In a practical circuit, a single channel or a plurality of channels such as shown in FIGURE 1 may be employed. In the latter case, each channel may be adjusted to a different iso-contour level. The channels may be connected in parallel or in series to the radar receiver, and the outputs of the channels may be applied directly or through shaping and impedance matching stages to the cathode ray tube indicator. These various embodiments are explained in more detail below. The indicator itself, as will be explained later, may be one of the PPI, rectilinear, or other area type display in which case the signal is applied to intensity modulate the cathode ray tube beam. Alternatively, the indicator may be one of the "A" type in which case the signal is applied to one set of deflection plates. Weather radar systems normally employ area type displays.

With the circuit of FIGURE 1, the output signal, as shown in FIGURE 2e, may extend considerably below the base line. The portion of the signal below the base line can readily be removed by applying the signal to a cathode follower having a properly adjusted operating bias.

A limitation of the circuit of FIGURE 1 is that the level at which iso-contour operation begins must be restricted to levels above the limit level. For levels below the limit level, diode 34 is not cut off, whereby current flows through the diode. This results in the deterioration of waveforms C and E.

The circuit of FIGURE 3 permits iso-contour operation at levels below the limit level. Elements similar in structure and function to those of FIGURE 1 have been indicated in FIGURE 3 with the same reference numerals primed.

The circuit of FIGURE 3 is similar to the one of FIGURE 1, with triode 60, capacitor 62 and resistors 64 and 66 added. In this form of the invention, rather than applying the inverted amplified input signal to the control grid of triode 26' through the first amplifier stage 20', it is applied instead to the control grid 68 of triode 60. An amplified and inverted version of the wave of FIGURE 2a appears across anode load resistor 64. Capacitor 69, formerly connected to the anode 30' of triode 20' is now connected instead to anode 70 of triode 60. Resistor 66 provides cathode bias for triode 60 and is included in a feedback loop along with capacitor 62. The lower terminal of capacitor 56', which was grounded in the circuit of FIGURE 1, is now returned to ground through resistor 66. The inclusion of resistor 66 in series with capacitor 56' does not objectionably reduce the by-passing effectiveness of capacitor 56', as its resistance is on the order of a few hundred ohms or less. The action of stages 20' and 26' is essentially the same as that described previously for the circuit of FIGURE 1, except that the currents which flow through diode 44' now produce positive signals at cathode 72 of triode 60. These signals appear at anode 70 of triode 60 amplified without phase inversion, thus reinforcing the effect of the negative input signal at grid 68 of triode 60.

The action above-described constitutes amplitude selected positive feedback since only those signals at anode 70 of tube 60, which ultimately cause conduction of diode 44', are fed back to the cathode 72 of triode 60. Capacitor 62 shunts only the higher frequency components of the feedback waveform to ground in order to control any tendency toward instability in the leading edge of the iso-contour waveform. Capacitor 62 also boosts the high frequency gain of triode 60 for signals applied to control grid 68 since it effectively by-passes the cathode resistor 66 at these high frequencies. The effect of the feedback loop is to increase the gain of triode 60 above its normal gain only when the input signal exceeds the iso-contour level. High gain in the iso-contour channel is desirable in order to increase the sharpness of transitions between white and black.

If, in the circuit of FIGURE 3, the lower terminal of capacitor 56' were connected directly to ground instead of to the cathode 72 of tube 60, the circuit would still operate correctly, but without positive feedback. An important advantage of the inclusion of positive feedback is the increase in the rapidity of the switching action of tube 26'. This produces sharper signal transitions. The beneficial effects of amplitude selected positive feedback can also be obtained with the circuit of FIGURE 1 if the terminal of capacitor 56 is removed from ground and connected to the upper end of resistor 28 in the cathode circuit of tube 20. When this is done, a small capacitor, similar to capacitor 62 of FIGURE 3, may be placed in parallel with resistor 28 in order to control any tendency toward instability due to the positive feedback.

The circuits shown in FIGURES 1 and 3 may be used, as is, in airborne weather radar systems. Either one may be connected between the receiver intermediate amplifier stages and the radar indicator. The output signal (FIGURE 2e) of the circuit may be applied, for example, to the control grid of a plan position type indicator.

In the display of the airborne weather radar system, all signal returns up to a certain level appear as bright marks, while all signals which exceed this level cause the indicator to go black. Due to the nature of rainfall return gradients in storms, the black marks caused by strong signals (those which exceed the iso-contour level) are almost always contained within bright areas, which are produced by signals which are below the iso-contour level. The display of a storm cell therefore usually appears as a ring surrounding a black hole (see FIGURE 8b). The black cores of storms are areas of heavy rainfall which are not to be entered by the aircraft, while the bright edges of the rings are less dangerous, but would probably also be avoided if a clear path around the storm cell or between a group of storm cells was available. The thickness of the walls of the bright ring around a black core yields some information as to the gradient of the rainfall rate of the storm and is therefore indicative of the turbulence that would be encountered in the storm cell. Thin, sharply defined edges indicating relatively abrupt change of rainfall rate, that is, a high gradient, should be considered dangerous. A wide ring of brightness between the background blackness and the core blackness indicates a gradual change in rainfall rate, or a comparatively mild gradient associated with a lesser degree of turbulence. The simple system with a bright ring and black hole is ordinarily sufficent for purposes of airborne weather path finding.

There is a slight possibility of ambiguity in the above described system. This arises from the fact that black on the indicator screen has two possible meanings: (a) no signal; (b) a strong signal which exceeds the iso-contour level. It is possible therefore for a bright ring surrounding a black hole to mean either an area of light or moderate rain which contains a core of heavy rain, or a closed band of light or moderate rain which encloses an area of no rain. The latter possibility is quite remote. However, the ambiguity can readily be resolved by momentarily by-passing the iso-contour circuit so that only the normal, non-inverted storm signal is presented on the indicator screen. If, in this case, the black hole becomes bright, as in the display of FIGURE 8a, the black hole indicates an area of heavy rainfall.

For ground weather radar equipment, where more equipment weight may be tolerated, and where as rapid interpretation of storm conditions need not be made, a different type of presentation may be employed. In this type of presentation, the storm appears on the radar screen as alternate bright and dark closed, irregular loops, somewhat like isohyetal lines on a weather map (see FIGURE 8c). The advantage of systems of this type is that gradations in rainfall intensity may be displayed.

In the weather radar system of FIGURE 4, a radar transmitter 80 transmits short pulses of radio frequency energy to antenna 82 which radiates the pulses into space in a highly directional beam. Although many different frequencies are possible, it has been found that a frequency corresponding to a wavelength of about 5 or 6 cm. gives exceptionally good performance in a weather type radar system. Antenna 82 is rotatable and may be driven by means of an azimuth drive motor or the like (not shown). The signals radiated from antenna 82 strike reflecting objects such as a storm cloud, and some are reflected back to the antenna. These pass through transmit-receive device 85 to radar receiver 86. The intermediate frequency signal output of the receiver is applied via line 88 to three separate iso-contour channels 90, 90′ and 90″. The channels may be similar to the ones of FIGURE 1 or of FIGURE 3. The output signals of channels 90, 90′ and 90″ are applied through mixer, clipper and impedance matching circuits 92 to the indicator 94. The indicator may be a PPI (Plan Position Indication) type of indicator in which case the swept electron beam moves synchronously with antenna 82. This may be accomplished, for example, by driving the rotatable deflection coil of the indicator in synchronism with the antenna either by direct drive means or through a servo system. The time base circuits for the indicator may be synchronized with the transmitted pulses by timing equipment 96.

The operation of the system of FIGURE 4 can be best understood by reference to FIGURE 5. The storm cloud echo signal may be shaped as shown in FIGURE 5a.

Circuits 90, 90′ and 90″ may be adjusted to contour levels A, B and C as indicated by dashed lines 100, 102 and 104, respectively. The outputs of circuits 90, 90′ and 90″ are shown in FIGURES 5b, c and d, respectively. These signals may be individually clipped, shaped and converted into spaced pulses and then combined or, if desired, may first be combined and then shaped. The latter mode of operation is illustrated in FIGURES 5e and f. The mixed output of circuits 90, 90′ and 90″ is shown in FIGURE 5e. This output may be clipped at the level indicated by dashed line 106 by passing the wave through a suitably biased diode. The resultant spaced pulses may then be applied to an overdriven amplifier circuit in order to make the pulses of the same amplitude and square them off. These may then be applied through impedance matching circuits to the deflection or intensity modulation means of the indicator.

A circuit in which the different iso-contour stages are connected in series is shown in FIGURE 6. This circuit may be substituted for circuits 90, 90′ and 90″ in the system shown in block form in FIGURE 4. The portion of the circuit within dashed block 150 is the same as the circuit shown in FIGURE 3. Assume that a video signal, such as shown in FIGURE 7j, is applied to the control grid of limiter stage 20. A signal of this type, of course, does not correspond to a storm signal but is given merely by way of illustration. The output wave of circuit 150 is as shown in FIGURE 7k with potentiometer 50 adjusted to the iso-contour level shown in FIGURE 7j.

For input signals to amplifier 26 of an amplitude greater than the first iso-contour level, a current wave $l$ passes through diode 44 to the cathode of grounded grid triode 152. The voltage wave $l'$ developed across the anode load resistor 154 of triode 152 is similar in shape to current wave $l$, but of greater amplitude. This signal is applied to stage 156 which has associated with it a diode 158 and potentiometer 160. The three last-named components operate in a manner similar to triode 26, diode 44 and potentiometer 50. The tapping point along potentiometer 160 determines the second iso-contour level. When the signal applied to the control grid 162 of stage 156 reaches a value greater than the second iso-contour level, diode 158 conducts and by-passes the cathode 164 via by-pass capacitor 166. In this manner, stage 156 is converted from a cathode follower to a relatively high gain amplifier and the wave shown in FIGURE 7m appears at its anode. The last-named wave is inverted by triode stage 168 and mixed in the common anode load circuit 24 with the wave of FIGURE 7k. The resultant iso-contour signal is shown in FIGURE 7n.

One or more additional contour levels may be provided by means similar to those described above. For example, a third iso-contour level could be produced by opening ground connection 169, placing a resistor shown as a phantom element 170 in series with capacitor 166, and applying the signal developed across this resistor to a third iso-contour level selector stage. This third stage could be similar to the second iso-contour level selector stage shown in FIGURE 6. The output of the third stage could be combined with the wave $n$.

Figure 8A:
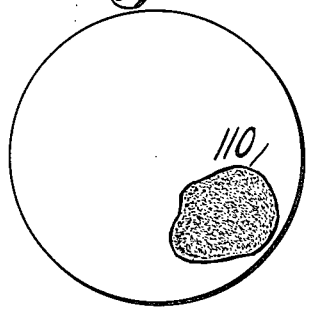
FIGURES 8a, 8b and 8c are sketches of radar displays with and without the iso-contour effect.
Figure 8C:
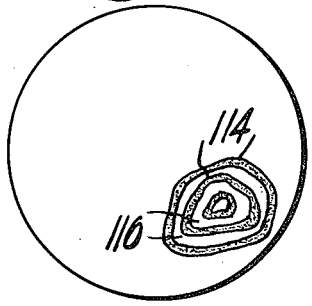
Figure 8B:
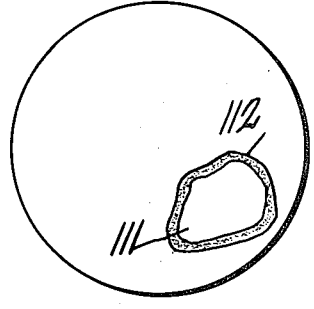

A conventional radar display of a storm area is shown in FIGURE 8a at 110. The stippled area appears on the indicator screen as a bright mark. With a single channel of iso-contour control, such as shown in FIGURE 1 or 3, the iso-contour display is as shown in FIGURE 8b. There is a black hole 111 within a bright, somewhat irregular, ring 112. The arrangement of the circuit of FIGURE 4 produces an iso-contour display such as shown in FIGURE 8c. The stippled irregular loops 114 are bright areas and the spaces 116 between the stippled loops are darker areas. The display produced with the circuit of FIGURE 6 is similar to the one of FIGURE 8c, the number of bright loops displayed being indicative of the storm intensity and the number of iso-contour levels in the circuit.

In the foregoing discussion no attempt is made to explain in detail various components of the radar system forming part of the present invention. For example, as is known, it is desirable to include in the system sensitivity time control circuits for presenting echoes received from distant targets at the same relative intensity as those received from near targets. Such circuits are well known to those skilled in this art. In like manner, details of the transmit-receive device, the intermediate frequency and video amplification stages, the various indicator circuits, etc., are neither explained nor illustrated in detail.

What is claimed is:

1. An iso-contour circuit comprising first amplifier means for receiving and amplifying an input signal; second amplifier means having an input circuit and an output circuit, and a relatively low gain for signals of lower than a predetermined amplitude applied to said input circuit; limiter means coupled between said first amplifier means and said output circuit for limiting the output signal of said first amplifier means to said predetermined amplitude and applying said limited signal to said output circuit; means for amplifying and inverting said input signal and applying the same after inversion and amplification to said input circuit; and means coupled to said second amplifier means and responsive to the application to said input circuit of a signal of greater than a predetermined amplitude for substantially increasing the gain of said second amplifier means.

2. An iso-contour circuit as set forth in claim 1, wherein said means for amplifying and inverting said input signal comprises said first amplifier means.

3. An iso-contour circuit as set forth in claim 1, wherein said means for amplifying and inverting said input signal comprises a third amplifier means.

4. An iso-contour circuit comprising a first electron discharge device for receiving and amplifying a negative-going video input signal; a second electron discharge device having an anode, cathode and control electrode, and substantially zero gain for signals of lower than a predetermined amplitude applied to said control electrode; limiter means coupled between said first electron discharge device and the anode of said second discharge device for limiting the output signal of said first discharge device to said predetermined level and applying said limited signal to the anode of said second discharge device; means for applying the output signal of said first discharge device to the control electrode of said second discharge device; and means coupled to said second discharge device and responsive to the application to said control electrode of a signal of greater than said predetermined level for substantially increasing the gain of said second discharge device.

5. An iso-contour circuit comprising a first electron discharge device for receiving and amplifying a negative-going video input signal; a second electron discharge device having an anode, cathode and control electrode, and substantially zero gain for signals of lower than a predetermined amplitude applied to said control electrode; means coupled between said first electron discharge device and the anode of said second discharge device for limiting the output signal of said first discharge device to said predetermined level and applying said limited signal to the anode of said second discharge device, and for increasing the gain of said first discharge device when its output signal is equal to or greater than said level; means for applying the output signal of said first discharge device to the control electrode of said second discharge device; and means coupled to said second discharge device and responsive to the application to said control electrode of a signal of greater than said predetermined level for substantially increasing the gain of said second discharge device.

6. An iso-contour circuit comprising a first electron discharge device for receiving and amplifying a negative-going video input signal; a second electron discharge device having an anode, cathode and control electrode, and a relatively low gain for signals of lower than a predetermined amplitude applied to said control electrode; limiter means coupled between said first electron discharge device and the anode of said second discharge device for limiting the output signal of said first discharge device to said predetermined level and applying said limited signal to the anode of said second discharge device; means for amplifying and inverting said video input signal and applying said inverted and amplified signal to the control electrode of said second discharge device; and means coupled to said second discharge device and responsive to the application to said control electrode of a signal of greater than said predetermined level for substantially increasing the gain of said second discharge device.

7. An iso-contour circuit comprising a first electron discharge device for receiving and amplifying a negative-going video input signal; a second electron discharge device having an anode, cathode and control electrode; an anode load resistor connected to said anode; a cathode load resistor having a value at least ten times greater than that of said anode load resistor connected to said cathode; limiter means coupled between said first electron discharge device and the anode of said second discharge device for limiting the output signal of said first discharge device to a predetermined level and applying said limited signal to the anode of said second discharge device; means for amplifying and inverting said video input signal and applying said inverted and amplified signal to the control electrode of said second discharge device; a low impedance by-pass circuit; and means responsive to the application to said control electrode of a signal of greater than a predetermined amplitude for effectively connecting said by-pass circuit across said cathode load resistor.

8. An iso-contour circuit as set forth in claim 7, said last-named means comprising a diode the anode of which is connected to said cathode and the cathode of which is connected to a point of reference potential having a value such that the diode is cut off for signals applied to said control electrode of lower than said predetermined amplitude and is rendered conductive for signals applied to said control electrode of at least equal to said predetermined amplitude.

9. A selective mixer comprising, in combination, an amplifier stage including an input circuit and output circuit and having an input circuit to output circuit gain of substantially less than one in response to signals applied to said input circuit of lower than a predetermined amplitude; means for applying a signal in one polarity to said output circuit and in the correct polarity to said input circuit to obtain a reverse polarity in said output circuit; and means responsive to a signal applied to said input circuit of greater than a predetermined amplitude for changing the input circuit to output circuit gain of said amplifier stage to a value substantially greater than one.

10. A selective mixer comprising an electron discharge device having a cathode, control electrode and anode and having an anode impedance which is a small fraction of the value of its cathode load impedance; means for applying a signal in one polarity to said control electrode and in the same polarity to said anode; and means responsive to the application to said control electrode of a signal of greater than a predetermined amplitude for effectively by-passing said cathode load impedance.

11. An iso-contour circuit comprising, in combination, first amplifier means including an electron discharge device having a cathode, control electrode and anode, and a load impedance connected to said anode; connection means for a negative-going video signal coupled to said control electrode; a second amplifier comprising a discharge device having a cathode, control electrode and anode, and also having an anode load impedance and a cathode load impedance, said anode load impedance being a small fraction of the value of said cathode load impedance, and in operation, the anode load impedance of said first discharge device being connected to a point of potential which is greater than that to which the anode load impedance of said second discharge device is connected; a diode the cathode of which is connected to the anode of said first discharge device and the anode of which is connected to the anode of said second discharge device; a third amplifier comprising a discharge device having a cathode, control electrode and anode, said control electrode being connected to said connection means and said anode being connected to the control electrode of said second discharge device; a second diode the anode of which is connected to the cathode of said second discharge device and the cathode of which is connected to a point of reference potential having a value such that the diode does not conduct until the signal applied to the control electrode of said second discharge device attains a predetermined amplitude; and a low impedance circuit connected to the cathode of said second diode and responsive to current flow through said diode for effectively by-passing the cathode load impedance of said second discharge device and effectively increasing the gain of said third discharge device.

12. An iso-contour circuit comprising, first amplifier means for receiving and amplifying a negative-going video input signal; second amplifier means comprising an electron discharge device having a cathode, control electrode and anode, an anode load impedance connected to said anode, and a cathode load impedance many times greater than said anode load impedance connected to said cathode; limiter means coupled between said first amplifier means and the anode of said second amplifier means for limiting the output signal of said first amplifier means to a predetermined level and applying said limited signal to said anode; means for amplifying and inverting said input signal and applying the same after inversion and amplification to said control electrode; a normally open, low impedance circuit having a value much lower than that of said cathode load impedance effectively connected in shunt across said cathode load impedance; and means responsive to the voltage developed across said cathode load impedance when the signal applied to said control electrode is equal to or greater than said predetermined amplitude for closing said circuit and thereby by-passing said cathode load impedance with said low impedance circuit.

13. In combination, an electron discharge device having a cathode, control element and anode, an anode load impedance connected to said anode, and a cathode load impedance connected to said cathode; means for applying a signal in one polarity to said control electrode and in the same polarity to said anode; and means responsive to the application to said control electrode of a signal of greater than a predetermined amplitude for effectively by-passing one of said load impedances.

14. In combination, an electron discharge device having a cathode, control element and anode, an anode load impedance connected to said anode, and a cathode load impedance connected to said cathode; means for applying a signal in one polarity to said control electrode and in the same polarity to said anode; and means responsive to the application to said control electrode of a signal of greater than a predetermined amplitude for effectively by-passing said cathode load impedance and regeneratively applying a signal derived from the current passed through said electron discharge device to said control electrode.

15. A weather radar system comprising, in combination, means for transmitting radio-frequency pulses to targets and receiving echoes from said targets; amplifier means including an input circuit and an output circuit; means for detecting said echoes and applying said detected echoes to said input circuit; means for limiting the detected echoes and applying the limited detected echoes to said output circuit in the same polarity as the echoes applied to said input circuit; means responsive to current conducted by said amplifier means of greater than a predetermined amplitude for changing the gain thereof from a value of substantially zero gain to a relatively high value of gain; and indicator means connected to said output circuit for indicating the resultant signal at said output circuit.

References Cited in the file of this patent
UNITED STATES PATENTS

| | | |
|---|---|---|
| 2,583,345 | Schade | Jan. 22, 1952 |
| 2,730,575 | Hayden-Pigg | Jan. 10, 1956 |
| 2,786,993 | Reid | Mar. 26, 1957 |